United States Patent Office 3,004,018
Patented Oct. 10, 1961

3,004,018
PROCESS AND CATALYST FOR THE PRODUCTION OF RUBBERY POLYMERS
Floyd E. Naylor, Bartlesville, Okla., assignor to Phillips Petroleum Company, a corporation of Delaware
No Drawing. Filed Mar. 21, 1958, Ser. No. 722,842
10 Claims. (Cl. 260—94.3)

This invention relates to a method for polymerizing 1,3-butadiene so as to obtain a rubbery polymer. In one aspect, the invention relates to a method for producing cis 1,4-polybutadiene. In another aspect, the invention relates to a novel catalyst system for use in the polymerization of 1,3-butadiene.

Various methods are described in the literature for polymerizing 1,3-butadiene, including emulsion polymerization, alkali metal-catalyzed polymerization, and alfin-catalyzed polymerization. Emulsion polymerization of 1,3-butadiene gives a polymer with from about 60 to about 80 percent trans 1,4-addition, from about 5 to about 20 percent cis 1,4-addition, and from about 15 to about 20 percent 1,2-addition. Sodium-catalyzed polybutadiene has from about 60 to about 75 percent 1,2-addition, the remainder being cis and trans 1,4-addition. When potassium and other alkali metals are employed as catalyst, the latter ratios may vary to some degree. Alfin-catalyzed polybutadiene has from about 65 to about 75 percent trans 1,4-addition, from about 5 to about 10 percent cis 1,4-addition and from about 20 to about 25 percent 1,2-addition. It appears that until recently no polymer of butadiene has been produced which contains more than about 35 percent cis 1,4-configuration. However, in the copending U.S. patent application of D. R. Smith and R. P. Zelinski, Serial No. 578,166, filed on April 16, 1956, a process is disclosed for producing polybutadiene in which a very high percentage of the polymer is formed by cis 1,4-addition of the butadiene.

It is an object of this invention, therefore, to provide a novel process for producing a rubbery polymer of 1,3-butadiene in which a high percentage of the polymer is formed by cis 1,4-addition of the monomer unit.

Another object of the invention is to provide a novel catalyst system for use in the polymerization of 1,3-butadiene.

A further object of the invention is to provide a method for polymerizing 1,3-butadiene so as to produce linear, soluble polymers.

A still further object of the invention is to provide a method for producing a polymer of 1,3-butadiene containing at least 85 percent and up to about 93 percent and higher cis 1,4-addition.

Other and further objects and advantages of the invention will become apparent to those skilled in the art upon consideration of the accompanying disclosure.

It has now been discovered that a rubbery polymer of 1,3-butadiene is obtained when 1,3-butadiene is polymerized in the presence of a catalyst composition comprising (a) an organometal compound corresponding to the formula $R_nM$, wherein R is an alkyl radical containing up to and including 12 carbon atoms, M is a metal selected from the group consisting of mercury and zinc, and $n$ is an integer equal to the valence of the metal M, and (b) titanium tetraiodide. The contacting of the catalyst with the 1,3-butadiene preferably occurs in the presence of a hydrocarbon diluent which does not inactivate the catalyst. The polybutadiene produced by the process of this invention is a rubbery polymer which contains as high as 93 percent and higher cis 1,4-addition.

The organometal compounds utilized in the catalyst system of this invention with titanium tetraiodide can be represented by the formula $R_nM$, wherein R is an alkyl radical containing up to and including 12 carbon atoms and M is mercury or zinc. The alkyl groups can be either straight or branched chain alkyls, for example, methyl, ethyl, propyl, isopropyl, n-butyl, isobutyl, pentyl, isohexyl, n-heptyl, n-octyl, or tert-dodecyl. Furthermore, it is to be understood that the alkyl groups in the aforementioned general formula can be the same or they can be different. For example, it is within the scope of the invention to employ an organometal compound such as isobutylethylzinc in the catalyst system of the instant invention. Examples of other suitable organometal compounds include dimethylmercury, diethylmercury, diisopropylmercury, di-n-butylmercury, diisobutylmercury, di-n-hexylmercury, di-n-undecylmercury, dimethylzinc, diethylzinc, diisopropylzinc, di-n-butylzinc, di-n-hexylzinc, di-n-octylzinc, di-n-decylzinc, di-n-dodecylzinc, and the like. It is also within the purview of the invention to employ mixtures of the organometal compounds in the catalyst system. It is, of course, to be understood that minor amounts of other materials which have no catalytic effect may be included in the system without departing from the spirit or scope of the invention.

The amount of the organometal compound used in the catalyst composition of this invention is usually in the range of 1.0 to 50 mols per mol of titanium tetraiodide. However, a preferred ratio is from 1.0 to 15 mols of the organometal compound per mol of titanium tetraiodide. The concentration of the total catalyst composition, i.e., organometal compound and titanium tetraiodide, is usually in the range of about 0.05 to 10 weight percent, preferably in the range of 0.05 to 5 weight percent, based on the total amount of 1,3-butadiene charged to the polymerization reactor.

The polymerization method of this invention can be carried out at any temperature within the range of 0 to 150° C. As disclosed in copending U.S. patent application Serial No. 730,780, filed April 25, 1958, the process of this invention can also be carried out at very low temperatures, e.g., from −80 to 0° C., so as to provide polymers having very high cis 1,4-configuration. It is preferred to carry out the polymerization in the presence of a hydrocarbon diluent, although the polymerization can be carried out without the use of such a diluent. Depending upon the polymerization temperature and the particular hydrocarbon diluent used, the polymerization can be conducted in either the liquid or the solid phase. The polymerization reaction can be carried out under autogenous pressure or any suitable pressure sufficient to maintain a reaction mixture substantially in the liquid and/or solid phase. The pressure will thus depend upon the particular diluent being employed and the temperature at which the polymerization is conducted. The pressure in the polymerization reactor will normally be the vapor pressure of the reaction mixture at the polymerization temperature, no outside source of pressure being necessary. However, higher pressures can be employed, if desired, these pressures being obtained by some such suitable means as the pressurization of the reactor with a gas which is inert with respect to the polymerization reaction.

Diluents suitable for use in the polymerization process are hydrocarbons which are not detrimental to the polymerization reaction. Suitable diluents include aromatics, such as benzene, toluene, xylene, ethylbenzene and mixtures thereof. It is also within the scope of the invention to use straight and branched chain paraffins which contain up to and including 10 carbon atoms per molecue. Examples of paraffins which can be utilized include propane, normal butane, normal pentane, isopentane, normal hexane, isohexane, 2,2,4-trimethylpentene (isooctane), normal decane, and the like. Mixtures of these paraffinic hydrocarbons can also be employed as diluents in the practice of the process of this invention. Cycloparaffins, such as cyclohexane, methylcyclohexane, and the like, can also be used. Furthermore, mixtures of any of the aforementioned hydrocarbons can be used as diluents.

The polybutadiene produced in accordance with this invention is a rubbery polymer. The term "rubbery polymer" includes elastomeric, vulcanizable polymeric material which after vulcanization, i.e., cross-linking, possesses the properties normally associated with vulcanized rubber, including materials which when compounded and cured exhibit reversible extensibility at 80° F. of over 100 percent of a specimen's original length with a retraction of at least 90 percent within one minute after release of the stress necessary to elongate to 100 percent. The rubbery polymers produced in accordance with this invention are linear polymers. With regard to the solubility of the rubbery polymers of this invention, they contain substantially no gel as determined by the standard gel determination test.

The process of this invention can be carried out as a batch process by charging 1,3-butadiene into a reactor containing catalyst and diluent, or the process can be carried out continuously by maintaining the above-mentioned concentrations of reactants in the reactor for a suitable residence time. The residence time in a continuous process will, of course, vary within rather large limits depending upon such variables as temperature, pressure, ratio of catalyst components, and catalyst concentration. In a continuous process, the residence time will generally fall within the range of one second to one hour where conditions within the specified ranges are employed. When a batch process is being employed, the time for the reaction can be as high as 100 hours or more.

Various materials are known to be destructive to the catalyst composition of this invention. These materials include carbon dioxide, oxygen and water. It is highly desirable, therefore, that the 1,3-butadiene be free of these materials as well as other materials which tend to inactivate the catalyst. Any of the known means for removing such contaminants can be used. Also, when a diluent is employed in the process, it is preferred that this material be substantially free of impurities such as water, oxygen and the like. In this connection, it is desirable to remove air and moisture from the reaction vessel in which the polymerization is carried out. Although it is preferred to carry out the polymerization under anhydrous or substantially anhydrous conditions, it is to be understood that some water can be tolerated in the reaction mixture. It is to be realized, however, that the amount of water which may be tolerated in the reaction mixture is insufficient to completely deactivate the catalyst.

At the completion of the polymerization reaction, when a batch process is used, the total reaction mixture is treated to inactivate the catalyst and precipitate the rubbery polymer by the addition of a material such as water or an alcohol. The polymer is then separated from the water or alcohol and diluent by any suitable means, such as decantation or filtration. In order to purify the rubbery polymer, the separated polymer can be redissolved in a suitable diluent and again precipitated by the addition of an alcohol. The polymer is again separated, as indicated hereinbefore, and then dried. Any of the diluents mentioned hereinabove can be used in this separation step to redissolve the polymer. When the process of the invention is carried out continuously, the total effluent from the reactor is pumped from the reactor to a catalyst-inactivating zone where the reactor effluent is contacted with a suitable catalyst-inactivating material, such as alcohol. When an alcohol or water are used as the catalyst-inactivating material, they also act to precipitate the polymer. In the event other catalyst-inactivating materials are employed which do not perform this dual function, it is also necessary to add a suitable material, such as an alcohol, to precipitate the polymer. The diluent and alcohol or water are then separated from the polymer by filtration or other suitable means and then dried. The rubbery polymer can also be redissolved in a suitable diluent and again precipitated, as described above, in order to purify the material. The diluent and alcohol can be separated, for example, by fractional distillation, and reused in the process. It is also within the scope of the invention to utilize an antioxidant, such as phenyl-beta-naphthylamine, in the process of this invention to prevent oxidation of the rubbery polymer. The antioxidant can be added, for example, to the reaction mixture prior to the precipitation of the polymer, to the solution of the redissolved polymer, or to the diluent in which the polymer is to be subsequently redissolved.

The rubbery polymers which result when 1,3-butadiene is polymerized by the method of this invention can be compounded by any of the known methods such as have been used in the past for compounding of natural rubber. Vulcanization accelerators, reinforcing agents and fillers such as have been employed in natural rubber can likewise be employed when compounding the polymers of this invention.

The cis 1,4-polybutadiene produced in accordance with this invention possesses physical properties which render it superior to conventional synthetic rubbers. Because conventional synthetic rubbers exhibit high hysteresis, i.e., high heat build-up, they are not too satisfactory for certain uses, e.g., in the manufacture of truck tires. The great stresses to which truck tires are subjected causes those made of conventional synthetic rubber to become extremely hot, resulting in blowouts in some cases. For this reason, truck tires are almost exclusively made from high grade natural rubber which has the property of low hysteresis. It has now been found that the cis 1,4-polybutadiene of this invention in vulcanized rubber stocks shows lower hysteresis than conventional synthetic rubber. This property of the polymer of this invention renders it especially suitable as a substitute for natural rubber in the manufacture of heavy truck tires. The cis 1,4-polybutadiene in vulcanized rubber stocks also shows higher resilience, lower freeze point, greater ease of mill breakdown, and higher tensile strength at 200° F. than conventional emulsion polymerized butadiene.

A more comprehensive understanding of the invention can be obtained by referring to the following illustrative examples which are not intended, however, to be unduly limitative of the invention. Samples of certain of the polymer products produced in the runs described in the examples were examined by infrared analysis. This work was carried out to determine the percentage of the polymer formed by cis 1,4-addition, trans 1,4-addition, and 1,2-addition of the butadiene. The procedure described hereinafter was employed in making these determinations.

The polymer samples were dissolved in carbon disulfide to form a solution having 20 grams of polymer per liter of solution. The infrared spectrum of each of the solutions (percent transmission) was then determined in a commercial infrared spectrometer.

The percent of the total unsaturation present as trans 1,4- was calculated according to the following equation and consistent units:

$$\epsilon = \frac{E}{tc}$$

where $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction was determined at the 10.35 micron band using the extinction coefficient of 133(liters-mols$^{-1}$-centimeters$^{-1}$).

The percent of the total unsaturation present as 1,2- (or vinyl) was calculated according to the above equation, using the 11.0 micron band and an extinction coefficient of 184(liters-mols$^{-1}$-centimeters$^{-1}$).

The absorption band maximum due to cis unsaturation varies from 13.5 microns to 13.8 microns, depending upon the percent of trans and vinyl unsaturation present. Cis unsaturation was determined by measuring the area of the entire band between 12.0 and 15.75 microns and correcting for the presence of the already measured trans and vinyl unsaturation. The extinction coefficient ε for cis unsaturation was determined as described above except that E was determined by using the formula log $(A_0/A)$, where $A_0$ was the total area in the 12.00 to 15.75 micron region and A was the area of the unabsorbed portion. The extinction coefficient thus calculated for cis unsaturation was 10.1 liters-mols$^{-1}$-centimeters$^{-1}$.

EXAMPLE I

A series of runs was conducted in which butadiene was polymerized to a rubbery polymer of high cis 1,4-configuration in the presence of a catalyst system consisting of dibutylmercury and titanium tetraiodide. These runs were carried out according to the following polymerization recipes:

|  | Parts by Weight | |
| --- | --- | --- |
|  | A | B |
| Butadiene | 100 | 100. |
| Toluene | 440 | 440. |
| Di-n-butylmercury (DBM) | variable | variable. |
| Titanium tetraiodide (TTI) | variable | variable. |
| Temperature, °C | 30 | 30. |
| Time, hours | 4 | 18.5. |

In these runs, polymerization bottles were charged with the appropriate amount of toluene, after which they were purged with notrogen for 3 minutes at the rate of 3 liters per minute. The titanium tetraiodide was then charged to the bottle as a solid, after which the dibutylmercury was charged as a 0.317 molar solution in toluene. The dibutylmercury was charged by means of syringe, the bottles having been capped with a rubber cap and punched crown cap after the titanium tetraiodide was charged. The butadiene was then charged by syringe, after which the bottles were pressured to 20 p.s.i. with nitrogen. The bottles were then placed in a 30° C. constant temperature bath and allowed to remain there for the indicated time. At the end of the polymerization period, the polymer was recovered by coagulation with isopropyl alcohol. The samples were coagulated with 2 parts by weight of phenyl-beta-naphthylamine which served as an antioxidant. The polymer samples were examined by infrared analysis to determine their structure. The results of these runs are set forth hereinbelow in Table I.

*Table I*

|  | Run No. | | | |
| --- | --- | --- | --- | --- |
|  | 1 | 2 | 3 | 4 |
| Receipe | A | B | B | B |
| DBM: | | | | |
|   Mmoles (Millimoles) | 10 | 16 | 8 | 6 |
|   phm [1] | 3.14 | 5.04 | 2.52 | 1.88 |
| TTI: | | | | |
|   Mmoles | 5 | 4 | 4 | 3 |
|   phm | 0.28 | 2.23 | 2.24 | 1.66 |
| Conversion, percent | 100 | 100 | 100 | 100 |
| Configuration by Infrared Analysis: | | | | |
|   cis-1,4 | 84.5 | 87.2 |  | 86.3 |
|   trans-1,4 | 12 | 9.2 |  | 10 |
|   vinyl | 3.5 | 3.6 |  | 3.7 |

[1] Parts per 100 parts of monomer.

EXAMPLE II

Three additional runs were made in which the procedure of Example I was followed. These runs were carried out according to the following recipe:

| | Parts by weight |
| --- | --- |
| Butadiene | 100 |
| Toluene | 440 |
| Di-n-butylmercury (DBM) (10 Mmoles) | 3.15 |
| Titanium tetraiodide (TTI) | variable |
| Temperature, °C | 50 |
| Time, hours | 16 |

The results of these runs are tabluated below in Table II.

*Table II*

|  | Run No. | | |
| --- | --- | --- | --- |
|  | 5 | 6 | 7 |
| TTI: | | | |
|   Mmoles | 6.7 | 5 | 3.3 |
|   phm | 3.76 | 2.8 | 1.83 |
| DBM/TTI mole ratio | 1.5 | 2 | 3 |
| Conversion, percent | 50 | 100 | 5 |

In the first of these runs, the polymer was recovered by coagulation with isopropyl alcohol without an antioxidant, while in the last two runs the polymer was coagulated with the same material and with 2 parts by weight phenyl-beta-naphthylamine. Infrared analysis of the product of run 5 indicated that the polybutadiene contained 78 percent cis 1,4-addition, 18 percent trans 1,4-addition, and 4 percent 1,2-addition.

EXAMPLE III

Another series of butadiene polymerization runs was carried out using the same procedure described in Example I except that the $R_nM$ compound used was di-n-butylzinc. The polymerization recipe for there runs was as follows:

| | Parts by weight |
| --- | --- |
| Butadiene | 100 |
| Toluene | 440 |
| Di-n-butylzinc (DBZ) | 3.15 |
| Titanium tetraiodide (TTI) | variable |
| Temperature, °C | 50 |
| Time, hours | 2 |

The results of these runs are set forth below in Table III.

*Table III*

|  | Run No. | | |
| --- | --- | --- | --- |
|  | 8 | 9 | 10 |
| DBZ: | | | |
|   Mmoles | 7.5 | 7.5 | 10.0 |
|   phm | 1.342 | 1.342 | 1.79 |
| TTI: | | | |
|   Mmoles | 7.5 | 6.1 | 5.0 |
|   phm | 4.131 | 3.354 | 2.784 |
| Conversion, percent | 40 | 50 | 60 |
| Configuration by Infrared Analysis: | | | |
|   cis-1,4 | not meas. | 86.6 | 76.2 |
|   Trans-1,4 | not meas. | 7.1 | 16.2 |
|   vinyl | not meas. | 6.3 | 7.6 |

EXAMPLE IV

A run was made in which butadiene was polymerized in the presence of a catalyst consisting of di-n-butylzinc and titanium tetraiodide. The run was carried out according to the procedure described in Example I. The polymerization recipe used was as follows:

| | Parts by weight |
| --- | --- |
| Butadiene | 100 |
| Toluene | 440 |
| Di-n-butylzinc (7.0 Mmoles) | 1.25 |
| Titanium tetraiodide (7.0 Mmoles) | 3.83 |
| Temperature, °C | 5 |
| Time, hours | 65 |

The results of this run are shown below in Table IV.

Table IV

| | Run No. 9 |
|---|---|
| Conversion, percent | 90 |
| Configuration by infrared analysis: | |
| cis-1,4 | 93.8 |
| trans-1,4 | 2.3 |
| vinyl | 3.9 |

The rubbery polymers produced in accordance with this invention have utility in applications where natural and synthetic rubbers are used. They can be used in the manufacture of automobile and truck tires and other rubbery articles, such as gaskets.

As will be apparent to those skilled in the art, many variations and modifications of the invention can be practiced in view of the foregoing disclosure. Such variations and modifications are believed to come within the spirit and scope of the invention.

I claim:

1. A method for polymerizing 1,3-butadiene which comprises contacting said 1,3-butadiene under polymerization conditions with a catalyst comprising (a) a compound corresponding to the formula $R_nM$, wherein R is an alkyl radical containing up to and including 12 carbon atoms, M is a metal selected from the group consisting of mercury and zinc, and $n$ is an integer equal to the valence of said metal M, and (b) titanium tetraiodide.

2. A method in accordance with claim 1 wherein said catalyst consists essentially of di-n-butylmercury and titanium tetraiodide.

3. A method in accordance with claim 1 wherein said catalyst consists essentially of di-n-butylzinc and titanium tetraiodide.

4. A method in accordance with claim 1 wherein said catalyst consists essentially of diethylmercury and titanium tetraiodide.

5. A method in accordance with claim 1 wherein said catalyst consists essentially of diethylzinc and titanium tetraiodide.

6. A method in accordance with claim 1 wherein said catalyst consists essentially of diisopropylzinc and titanium tetraiodide.

7. A method for producing a rubbery polymer of 1,3-butadiene containing a high percentage of cis 1,4-addition which comprises contacting said 1,3-butadiene at a temperature in the range of zero to 150° C. with a catalyst comprising (a) a compound corresponding to the formula $R_nM$, wherein R is an alkyl radical containing up to and including 12 carbon atoms, M is a metal selected from the group consisting of mercury and zinc, and $n$ is an integer equal to the valence of said metal M, and (b) titanium tetraiodide, in the presence of a hydrocarbon diluent, the ratio of the amount of said $R_nM$ compound and said titanium tetraiodide being in the range of 1.0 to 50 mols of said $R_nM$ compound per mol of said titanium tetraiodide, and the concentration of said catalyst being in the range of 0.05 to 10 weight percent based on said 1,3-butadiene; and recovering the rubbery polymer so produced.

8. A method in accordance with claim 7 wherein the ratio of the amount of said $R_nM$ compound and said titanium iodide in said catalyst is in the range of 1.0 to 15 mols of said $R_nM$ compound per mol of said titanium tetraiodide.

9. A method for producing a rubbery polymer of 1,3-butadiene containing a high percentage of cis 1,4-addition which comprises contacting said 1,3-butadiene with a catalyst consisting essentially of a mixture of 1.0 to 10 mols of di-n-butylmercury per mol of titanium tetraiodide in the presence of a hydrocarbon diluent under autogenous pressure and at a temperature in the range of zero to 150° C., the concentration of said catalyst being in the range of 0.05 to 10 weight percent based on said 1,3-butadiene.

10. A method for producing a rubbery polymer of 1,3-butadiene containing a high percentage of cis 1,4-addition which comprises contacting said 1,3-butadiene with a catalyst consisting essentially of a mixture of 1.0 to 15 mols of di-n-butylzinc per mol of titanium tetraiodide in the presence of a hydrocarbon diluent under autogenous pressure and at a temperature in the range of zero to 150° C., the concentration of said catalyst being in the range of 0.05 to 10 weight percent based on said 1,3-butadiene; and recovering the rubbery polymer so produced.

References Cited in the file of this patent

UNITED STATES PATENTS

| 2,832,759 | Nowlin et al. | Apr. 29, 1958 |
| 2,846,427 | Findlay | Aug. 5, 1958 |
| 2,882,264 | Barnes et al. | Apr. 14, 1959 |
| 2,914,515 | Stuart | Nov. 24, 1959 |

FOREIGN PATENTS

| 540,459 | Belgium | Feb. 9, 1956 |